US006731817B2

(12) United States Patent
Shibaki et al.

(10) Patent No.: US 6,731,817 B2
(45) Date of Patent: May 4, 2004

(54) APPARATUS AND METHOD FOR FORMING AN IMAGE BY PROCESSING INPUT IMAGE DATA WHILE SUPPRESSING BANDING AND DROPOUT

(75) Inventors: Hiroyuki Shibaki, Tokyo-to (JP); Hiromi Okubo, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 647 days.

(21) Appl. No.: 09/775,601

(22) Filed: Feb. 5, 2001

(65) Prior Publication Data

US 2001/0019632 A1 Sep. 6, 2001

(30) Foreign Application Priority Data

Feb. 4, 2000 (JP) .................................. 2000-028222

(51) Int. Cl.⁷ ................................................ G06K 9/38
(52) U.S. Cl. ..................................................... 382/252
(58) Field of Search .................... 382/251, 252, 382/270; 358/2.1, 3.03–3.06, 3.21–3.24, 465, 466

(56) References Cited

U.S. PATENT DOCUMENTS

| | | | |
|---|---|---|---|
| 4,979,129 A | | 12/1990 | Okubo et al. |
| 5,086,484 A | * | 2/1992 | Katayama et al. ............ 382/270 |
| 5,243,443 A | * | 9/1993 | Eschbach .................... 358/3.03 |
| 5,392,137 A | | 2/1995 | Okubo |
| 5,410,619 A | | 4/1995 | Fujisawa et al. |
| 5,473,444 A | | 12/1995 | Sakano et al. |
| 5,647,010 A | | 7/1997 | Okubo et al. |
| 5,652,803 A | | 7/1997 | Tachikawa et al. |
| 5,659,628 A | | 8/1997 | Tachikawa et al. |
| 5,739,917 A | * | 4/1998 | Shu et al. ..................... 358/2.1 |
| 5,748,794 A | * | 5/1998 | Maeda et al. ............... 382/251 |
| 5,751,854 A | | 5/1998 | Saitoh et al. |
| 5,781,653 A | | 7/1998 | Okubo |
| 6,041,139 A | | 3/2000 | Okubo et al. |
| 6,122,406 A | | 9/2000 | Okubo |
| 6,272,248 B1 | | 8/2001 | Saitoh et al. |
| 6,328,400 B1 | * | 12/2001 | Yonekubo et al. ............. 347/15 |
| 2002/0021455 A1 | | 2/2002 | Ishii et al. |

OTHER PUBLICATIONS

2002/0021455 Feb. 21, 2002, Ishii et al.
U.S. patent application Ser. No. 09/663,843, filed Sep. 15, 2000, pending.
U.S. patent application Ser. No. 09/775,601, filed Feb. 5, 2001, pending.
U.S. patent application Ser. No. 10/105,361, filed Mar. 26, 2002, pending.
U.S. patent application Ser. No. 10/251,798, filed Sep. 23, 2002, pending.
U.S. patent application Ser. No. 09/775,601, Shibaki et al., filed Feb. 5, 2001.

(List continued on next page.)

Primary Examiner—Jose L. Couso
(74) Attorney, Agent, or Firm—Oblon, Spivak, McClelland, Maier & Neustadt, P.C.

(57) ABSTRACT

An apparatus and method to convert input image data having a first multivalue to image data having a second multivalue which is less than the first multivalue by using a multi error diffusion technique. An image processing apparatus includes a threshold generating device for generating a plurality of variable thresholds at least based on a characteristic of a target pixel data, wherein a number of the variable thresholds is less than a number of the second multivalue by one. A quantization device is provided to quantize the input image data of the target pixel into the image data having the second multivalue based on the variable thresholds. The variable thresholds are varied in a manner such that predetermined quantized data quantized by the quantization device does not create noticeable banding substantially in a middle density range and does not create noticeable dropout substantially in a high density range.

17 Claims, 11 Drawing Sheets

OTHER PUBLICATIONS

U.S. patent application Ser. No. 10/391,211, Morimoto et al., filed Mar. 19, 2003.
U.S. patent application Ser. No. 07/939,935, filed Sep. 2, 1992, unknown.
U.S. patent applciation Ser. No. 09/330,007, filed Jun. 11, 1999, pending.
U.S. patent application Ser. No. 09/473,647, filed Dec. 28, 1999, pending.
U.S. patent application Ser. No. 09/775,601, filed Feb. 5, 2001, pending.

* cited by examiner

*: TARGET PIXEL

|  | ANTI BANDING PERFORMANCE OF FROM LOW TO MIDDLE DENSITY SECTIONS | DROPOUT IN SOLID BLACK SECTION |
|---|---|---|
| BINARY ERROR DIFFUSION | STRONG AGAINST BANDING | DROPOUT VISIBLE |
| MULTI LEVEL ERROR DIFFUSION | BANDING VISIBLE | DROPOUT NOT VISIBLE |

APPARATUS AND METHOD FOR FORMING AN IMAGE BY PROCESSING INPUT IMAGE DATA WHILE SUPPRESSING BANDING AND DROPOUT

CROSS REFERENCE TO RELATED DOCUMENTS

This application claims priority under 35 U.S.C. § 119 to Japanese Patent Application No. 2000-028222 filed on Feb. 04, 2000, the entire contents of which are hereby incorporated herein by reference.

BACKGROUND OF THE INVENTION

1. Field of the Invention

The present invention generally relates to an image processing apparatus, such as a digital copier, a facsimile, etc. that quantizes an input image signal into multilevel data, and in particular relates an image processing apparatus capable of outputting an image of one pixel at a multilevel.

2. Discussion of the Background

In general, as a pseudo halftone processing technique in which a halftone is reproduced using binary dots (i.e., dot existence/no existence), an error defusing method has been known. According to such an error defusing method, an error arising when each pixel is made into binary data is defused to a plurality of circumjacent pixels. Also, a multilevel error defusing method has been known as an extension of the error defusing method to a multilevel. The multilevel error defusing method defuses an error, which arises when a number of input levels of each pixel is converted into a fewer number of output levels, to a plurality of circumjacent pixels.

As one example of this type of background quantizing technique, Japanese Patent No. 2581662 proposes a method in which a performance of a halftone image is based on sharpness of character. The method recognizes characteristics of an image from an image signal of a pixel in the vicinity of a target pixel and outputs an image with a decreased number of multilevels in a character section and an increased number of multilevels in a halftone image section, by switching a number of multilevel quantization in the multilevel error diffusion. The characteristics of an image are typically related to an average of multilevel data of circumjacent of a target pixel that has already been quantized, and an edge value of the image.

Such a background technique indicates that the quality of an image (e.g. a picture pattern section) is fine if a number of output levels is larger because a performance is improved.

However, depending on development and charge performances of an image forming engine and driving precision of a roller, a photosensitive member, etc., a stable image reproduction can occasionally be obtained when a number of output levels is reduced rather than increased.

Figure 18:
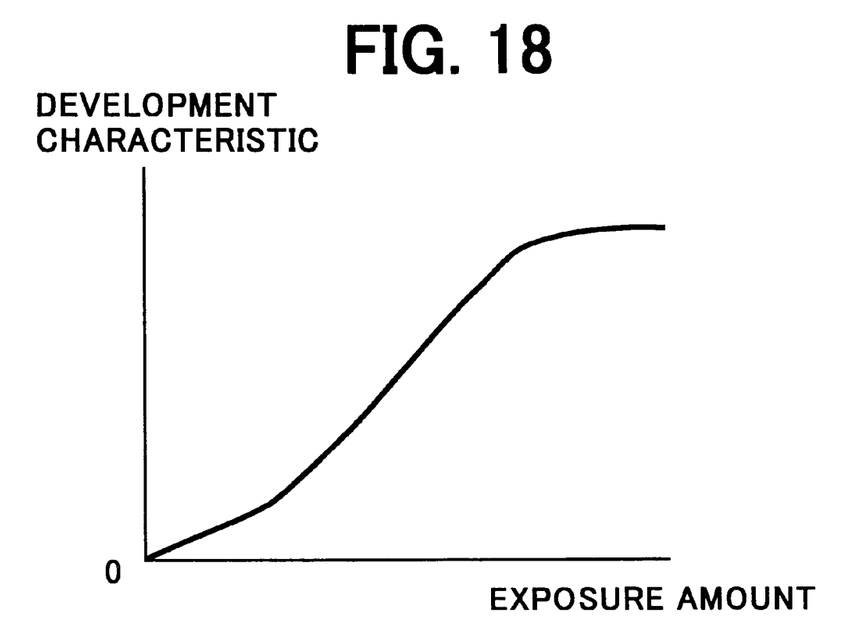
FIG. 18 is a chart illustrating a typical relation between development characteristics and exposure amount.
Figure 19:
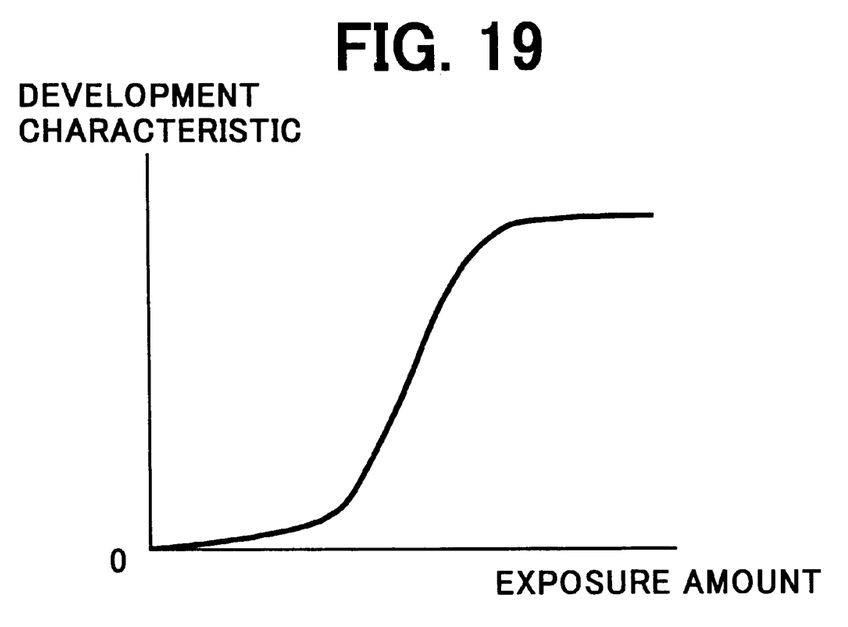
FIG. 19 is a chart illustrating another typical relation between development characteristics and exposure amount.

Further, when an image forming engine having relatively linear development characteristics in relation to an exposure amount, as illustrated in FIG. 18, is compared with one having development characteristics of sharp increase at more than a prescribed exposure level, as illustrated in FIG. 19, density reproduction performance in an output image of the error diffusing method whose number of output levels is large is inferior when utilized in a device having the development characteristics of FIG. 19. This is because stability is inferior to the characteristics of FIG. 18 due to multilevel exposure executed at a sharp inclination section of the development characteristics.

In addition, when a writing operation is executed at a middle level, an image is generally affected greatly by uneven charge and drive, and as a result, a so called banding phenomenon (i.e., a band formed in an image in a sheet feeding direction) tends to appear in a middle density section, and thereby image quality sometimes is inferior. Thus, in such a situation, image quality is fine if a writing operation is performed using a binary error diffusion technique not at a multilevel.

However, a problem may arise with a dropout appearing in a high density image range when processing with the binary error diffusion technique. Specifically, since a binary error diffusion process uses a so called area gradation technique that represents density with a black pixel and a white pixel, a white dropout dot exists in a solid black in a high density range in which density is slightly lower than a solid black section and visually gives an ill affect.

Figure 20:
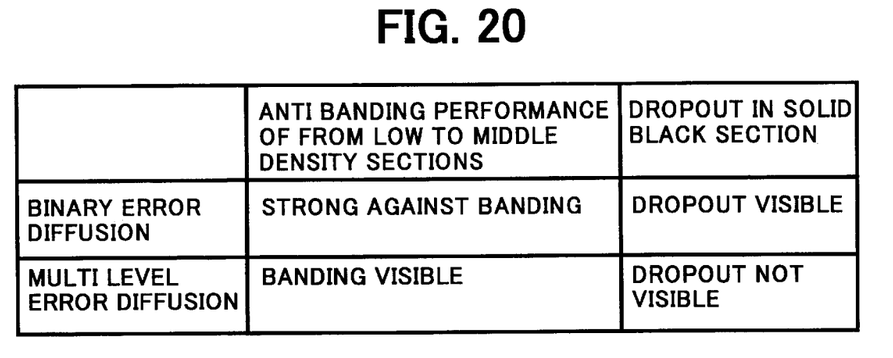
FIG. 20 is a chart illustrating relations between background error diffusion techniques and drawbacks.

For such representation of gradation of a high density section, a multilevel error diffusion technique is more superior to a binary error diffusion technique. Namely, according to the multilevel error diffusion technique, such an image is reproduced such that a thin dot can be formed in a rigid black and dropout does not appear so as not to visually give an ill affect. FIG. 20 illustrates a relation between the above-discussed properties of the binary error and multivalue error diffusion techniques, and as noted therefrom, the binary error diffusion technique is preferable with regard to an anti-banding performance in low to middle density sections, but dropout is noticeable in a rigid black section. To the contrary, the multilevel error diffusion technique is preferable with regard to the dropout in the rigid black section, but banding is noticeable in low to middle density sections.

SUMMARY OF THE INVENTION

Accordingly, an object of the present invention is to address and resolve the above and other problems and to provide a novel image processing apparatus.

The above and other objects are achieved according to the present invention by providing a novel image processing apparatus that converts input image data having a first multivalue to image data having a second multivalue which is less than the first multivalue by using a multivalue error diffusion technique. The image processing apparatus includes a threshold generating device configured to generate a plurality of variable thresholds at least based on a characteristic of a target pixel data, wherein the variable thresholds have a number less than the second multivalue by one. A quantization device is provided to quantize the input image data of the target pixel into the image data having the second multivalue based on the variable thresholds. The variable thresholds are varied in a manner such that prescribed quantized data quantized by the quantization device does not create noticeable banding in an image substantially in a middle density range and does not create noticeable dropout in an image substantially in a high density range.

In another embodiment, the threshold generating device generates the variable thresholds based on input image data of the target pixel and at least one circumjacent pixel.

In yet another embodiment, the variable thresholds are determined based on an average of the input image data of the target pixel and the at least one circumjacent pixel.

In yet another embodiment, a difference of the variable thresholds becomes large in accordance with an increase in a value of the input image data of the target pixel.

In yet another embodiment, the variable thresholds are substantially the same even if the input image data of the target pixel increases in value.

In yet another embodiment, the variable thresholds are substantially entirely or partially equal to each other, when a value of input image data of the target pixel is less than a prescribed level.

In yet another embodiment, the lowermost variable thresholds are fixed to a prescribed level.

In yet another embodiment, the threshold generating device selects and sets one set of variable thresholds from a plurality of thresholds sets.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Referring now to the drawings, wherein like reference numerals and marks designate identical or corresponding parts throughout the several views, the present invention is now described. First, a general multilevel error diffusion technique is described with reference to FIGS. 1 to 6.

Figure 1:
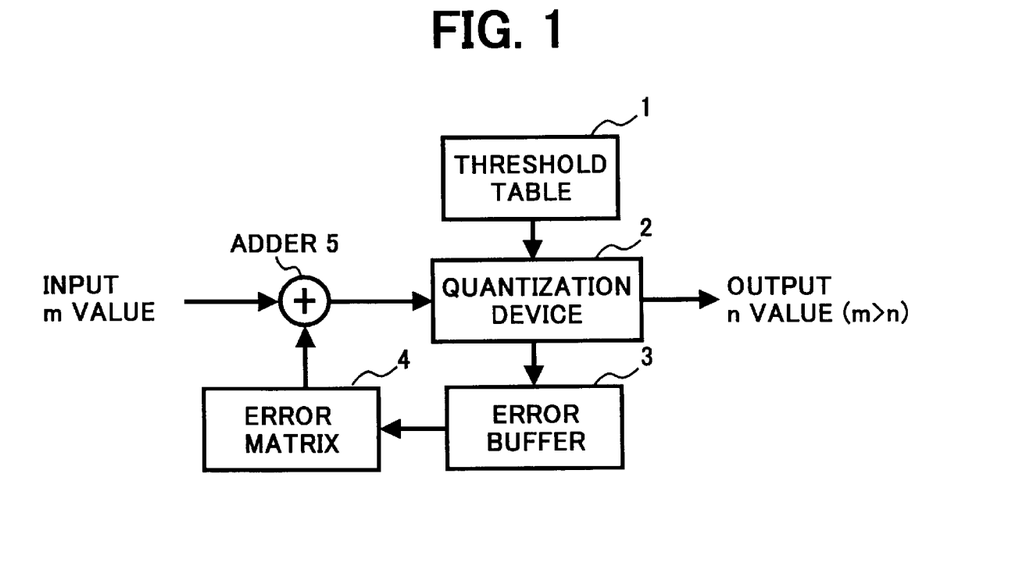
FIG. 1 is a block chart illustrating a general multilevel error diffusion processing section.
Figure 2:
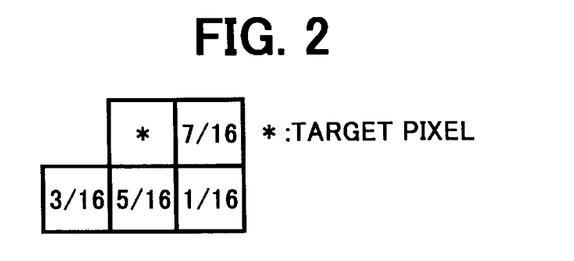
FIG. 2 is a chart illustrating an error diffusion matrix employed in the general multilevel error diffusion processing section illustrated in FIG. 1.

FIG. 1 illustrates a multilevel error diffusion processing section that executes a halftone process in which input image data whose one pixel has (m) values (e.g. gradation number 256 and 8 bits) is converted into output image data whose one pixel has (n) values smaller than the (m) value. Image data of a target pixel (hereinafter referred to as target pixel data) which is input is quantized by a quantizing device 2 based on fixed thresholds Th read from a threshold table 1 and having a number of thresholds of (n−1). An error arising during the quantization is accumulated in an error buffer 3. An error matrix 4 then diffuses the error to a plurality of circumjacent pixels. For example, the error matrix 4 is configured to defuse error data to the plurality of circumjacent pixels by a prescribed different weighting coefficient as illustrated in FIG. 2. Error data defused by the error matrix 4 is added to a target pixel data, which is newly input, by an adding device 5. Subsequently, the quantizing device 2 quantizes such added data. A halftone process is performed by repeating such a process.

Figure 3:
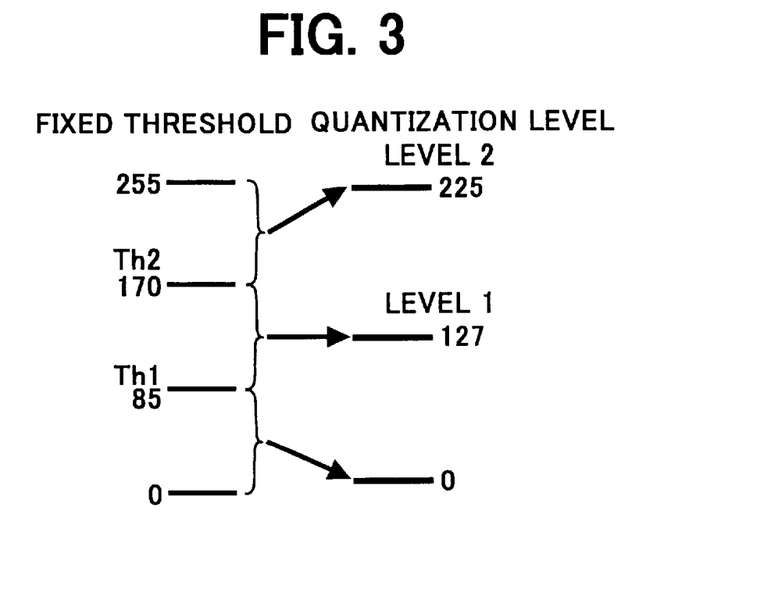
FIG. 3 is a chart illustrating thresholds that are utilized in a three level error diffusion process.

The general multilevel error diffusion is now described in further detail with reference to a three level error diffusion technique. FIG. 3 illustrates one example of two thresholds Th1 and Th2 and applicable quantization levels. The two thresholds Th1 and Th2 are read from the threshold table 1 and include gradation numbers 85 and 170, respectively. A plurality of quantization levels 0, 1, and 2 are assigned to respective of gradation numbers (0), (127), and (255).

Figure 4:
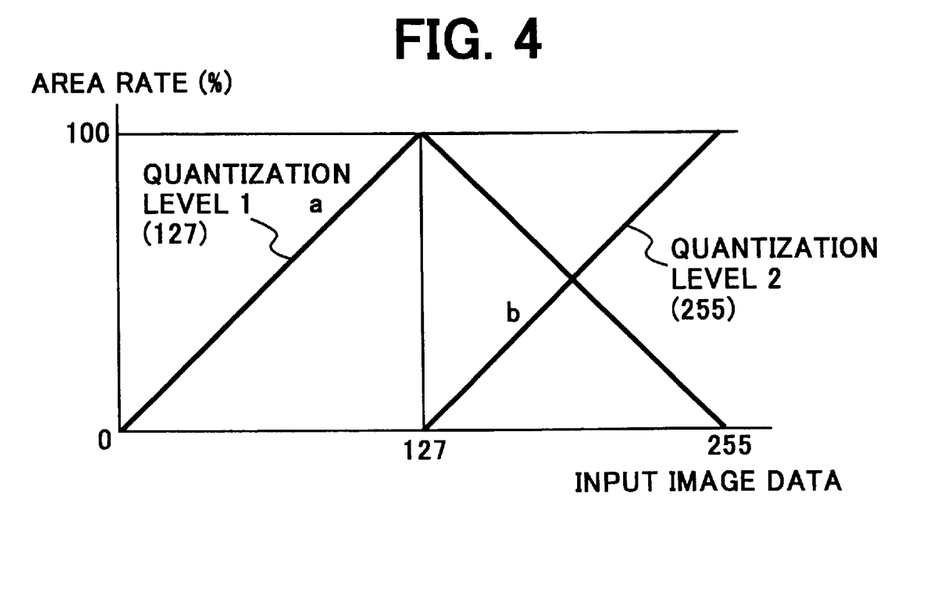
FIG. 4 is a chart illustrating an area rate curvature indicating a relation between an area rate and input image data when the three level error diffusion process is executed.

In such a three level error diffusion technique, an area rate, which represents a black area per a unit area, is unequivocally determined by input image data (varying from gradation numbers 0–255) as illustrated in FIG. 4. A curvature (a) illustrated in FIG. 4 represents an area rate curvature for a quantization level 1 (i.e., gradation number 127). A curvature (b) also represents an area rate curvature for a quantization level 2 (i.e., gradation number 255). As noted from FIG. 4, when input image data ranges from gradation number 0 to 127, a number of dots of the quantization level 1 continuously increases, and an area rate becomes 100% when input image data substantially comes to gradation number 127. When a number of input data increases, a number of dots having the quantization level 2 starts appearing, and a number of dots of the quantization level 1 decreases to the contrary. When input image level substantially comes to gradation number 255, substantially all of the dots are formed by the quantization level 2.

Thus, according to the three level error diffusion technique, it is realized that a great number of dots having a middle level (i.e., the quantization level 1) are generated at around the input level of gradation number 127, and image reproduction is performed by a plurality of dots that are weak against external interruption such as unevenness of charge and drive. As a result, banding or the like arises at a middle density section.

Figure 5:
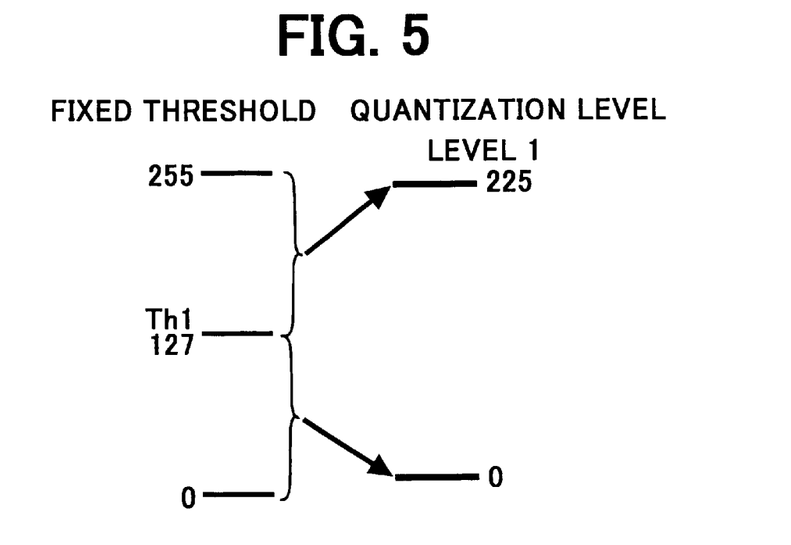
FIG. 5 is a chart illustrating thresholds that are utilized when a binary error diffusion process is executed.
Figure 6:
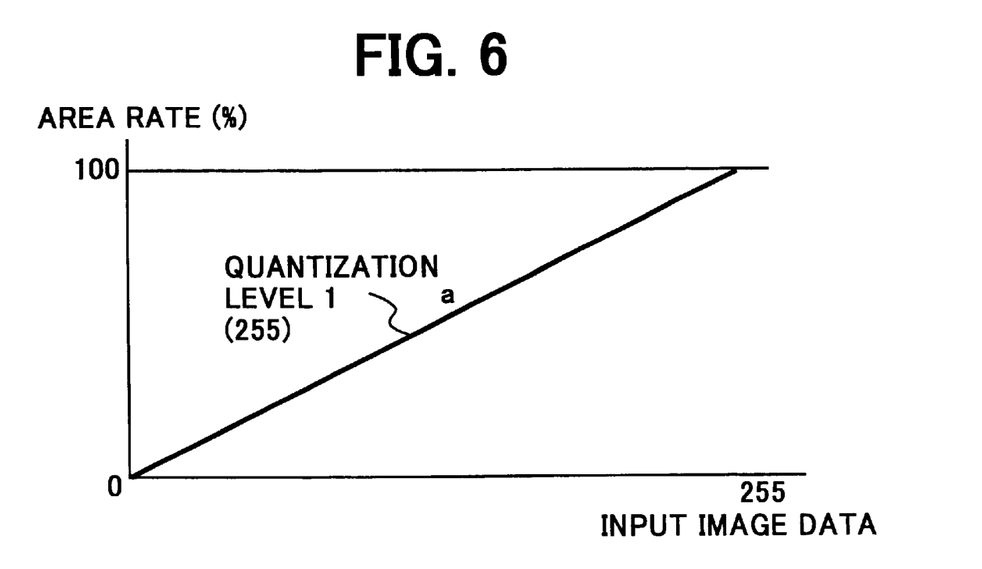
FIG. 6 is a chart illustrating an area rate curvature which appears when the binary error diffusion process is executed.

In comparison with the above-noted three level error diffusion technique, dot formation by a binary error diffusion technique is now described referring to FIGS. 5 and 6. FIG. 5 illustrates one example of a threshold Th1 and applicable quantization levels for the binary error diffusion. A fixed threshold level Th1 read from the threshold table 1 has gradation number 127. The applicable quantization levels 0 and 1 are assigned to gradation levels (0) and (255), respectively.

In such a binary error diffusion technique, an area rate can unequivocally be determined in accordance with input image data (ranging from gradation levels 0 to 255) as illustrated in FIG. 6. A curvature (a) illustrated in FIG. 6 indicates an area rate curvature of a quantization level 1 (i.e., gradation number 255), and as noted therefrom, the area rate continuously increases as input image data increases from gradation level 0–255. When the input image data reaches gradation number 255, the area rate becomes 100%. Thus, according to the binary error diffusion of FIGS. 5 and 6, it can be realized that when input data is smaller than the input image data of gradation number 255, the area rate can not be 100%, and a white dot whose quantization level is zero is produced in an image. In the binary error diffusion method, since a white dot exists in an image as described above when image density is slightly lower than that of a rigid black, dropout sometimes is noticeable in a rigid black image, which visually gives an ill affect.

To this end, according to the present invention as described below in detail, a great number of dots having a prescribed quantization level, by which stable dot reproduction is enabled, are arranged among a plurality of quantization levels to appear in a middle density range in which the banding is noticeable. In addition, a number of dots having a middle quantization level are arranged among the plurality of quantization levels to positively appear in a high density range in which the dropout typically is noticeable so that the dropout is not noticeable. As a result, image reproduction is of high quality.

The first embodiment of the present invention is now described with reference to FIGS. 7 through 10 in which threshold generation control for three level error diffusion is described as one example.

Figure 7:
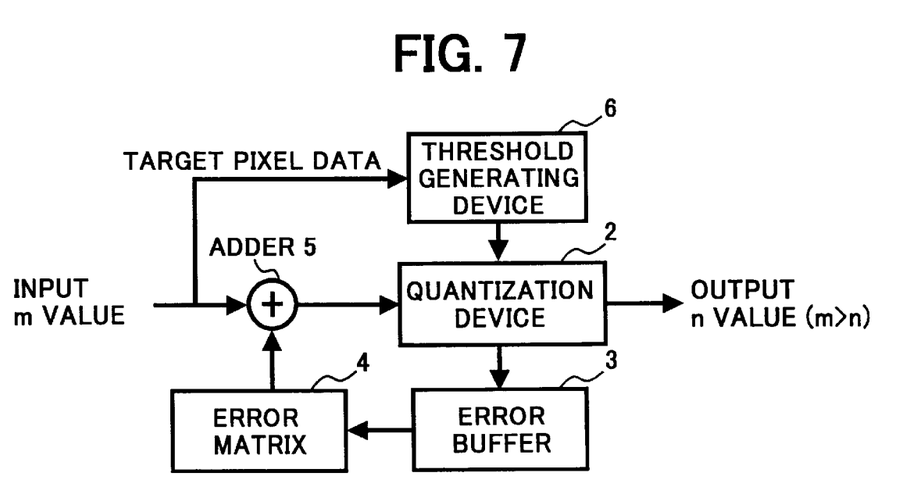
FIG. 7 is a block chart illustrating one example of an image processing apparatus according to the present invention.

In FIG. 7, a threshold generating device 6 may be arranged to generate variable thresholds Th1 and Th2 in accordance with a value of input image data of a target pixel. A quantizing device 2 may perform three level quantization for error diffusion based on the thresholds Th1 and Th2 generated by the threshold generating device 6. A quantizing device 2, an error buffer 3, an error matrix 4, and an adder 5 may be substantially the same construction as those illustrated in FIG. 1.

Figure 8:
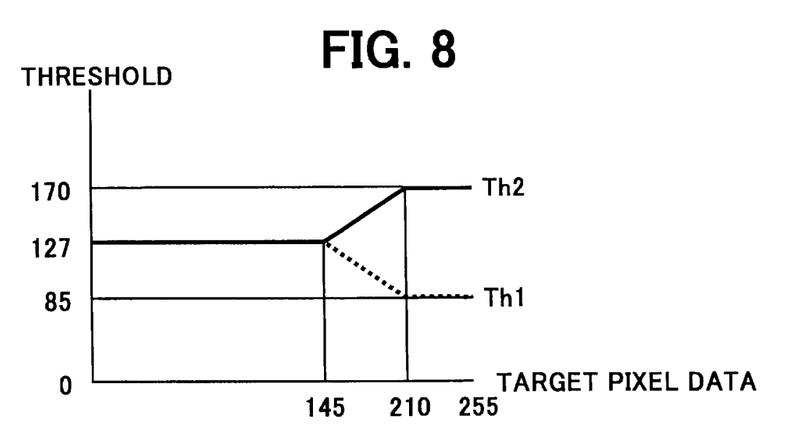
FIG. 8 is a chart illustrating one example of a threshold employed in the image processing apparatus illustrated in FIG. 7.
Figure 9:
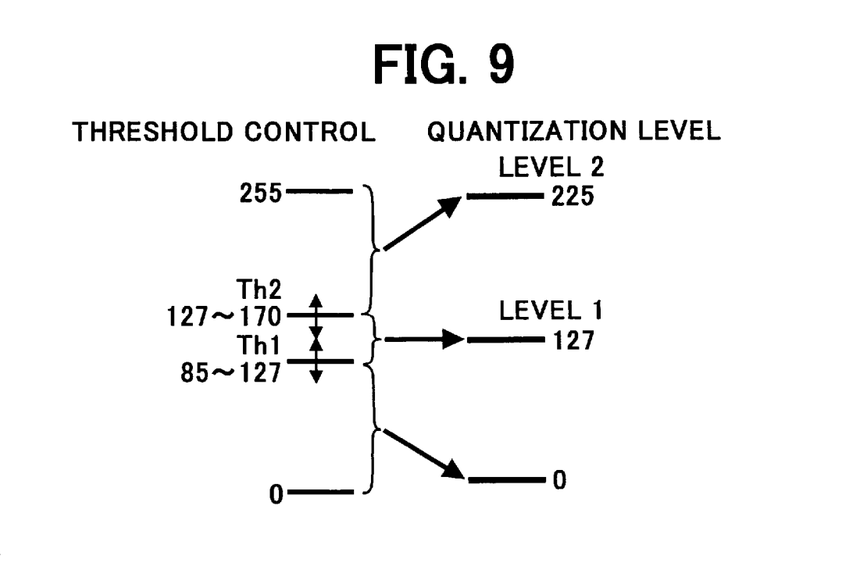
FIG. 9 is a chart illustrating quantized data by the threshold illustrated in FIG. 8.

For example, the threshold generating device 6 may output a plurality of thresholds Th1 and Th2 in accordance with target pixel data (ranging from gradation numbers 0–255) as illustrated in FIG. 8. Specifically, when the target pixel data includes a gradation number less than 145, both of the thresholds Th1 and Th2 that are substantially equal to gradation number 127 may be output. When the target pixel data includes a gradation number less than 210, Th1 having gradation number 85 and Th2 having gradation number 170 may be output, respectively. Further, when the target pixel data ranges from gradation number 145 to 210, a pair of thresholds Th1 and Th2 that vary as indicated by straight lines connecting gradation number 127 with 85, and gradation number 127 with 180, respectively, may be output. Accordingly, input image data having eight bits may be quantized into three quantization levels (i.e., level 0 for gradation number (0), level 1 for gradation number (127), and level 2 for gradation number (255)) by the two thresholds Th1 and Th2 for printing as illustrated in FIG. 9.

Figure 10:
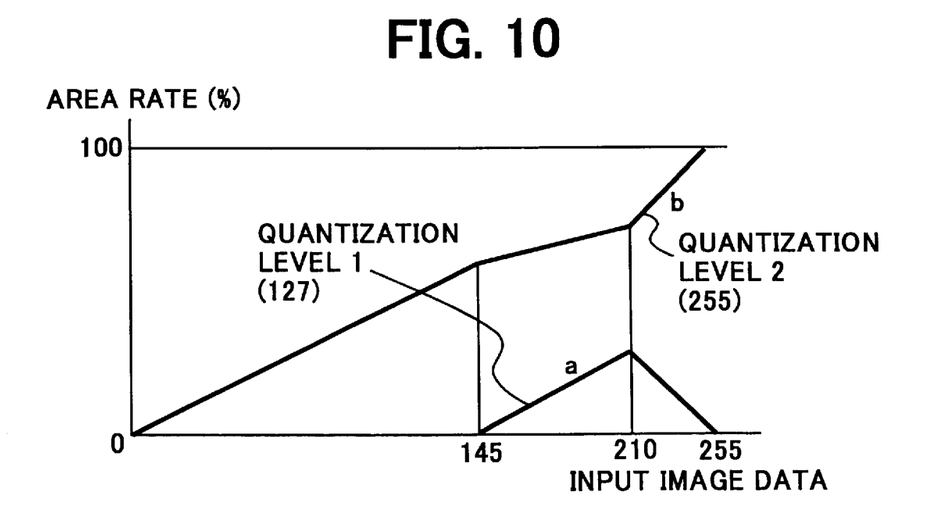
FIG. 10 is a chart illustrating a relation between an area rate and input image data.

FIG. 10 illustrates a plurality of area rates (a) and (b) of quantization levels 1 (for gradation number 127) and 2 (for gradation number 255), respectively, which are assigned in accordance with the input image data (ranging from gradation numbers 0–255). As noted from both of curvatures (a) and (b) of FIG. 10, the threshold Th1 substantially equals the threshold Th2 when input image data ranges from gradation number 0 to 145, a dot of the quantization level 1 may not appear, and as a result a dot similar to that produced by the binary error diffusion may appear. While input image data ranges from gradation number 145 to 210, since a difference between thresholds Th1 and Th2 is controlled to gradually increase in accordance with the input image data ranging from gradation number 145 to 210, a dot of the quantization level of 1 appears for the first time. When input image data is more than gradation number 210, an image is arranged to be substantially filled up with dots of either the quantization level 1 or 2, and a dropout dot substantially does not appear.

Thus, since variable thresholds Th1 and Th2 are generated in accordance with input image data, a large number of dots having a large quantization level (e.g. quantization level 2 (i.e., gradation number 255) in this embodiment) can be output below a middle density section. Moreover, a dot of a middle quantization level can positively be output in a high density range (e.g. more than gradation number 210). As a result, a halftone process having superior anti-banding performance can be performed without dropout being noticeable.

Figure 11:
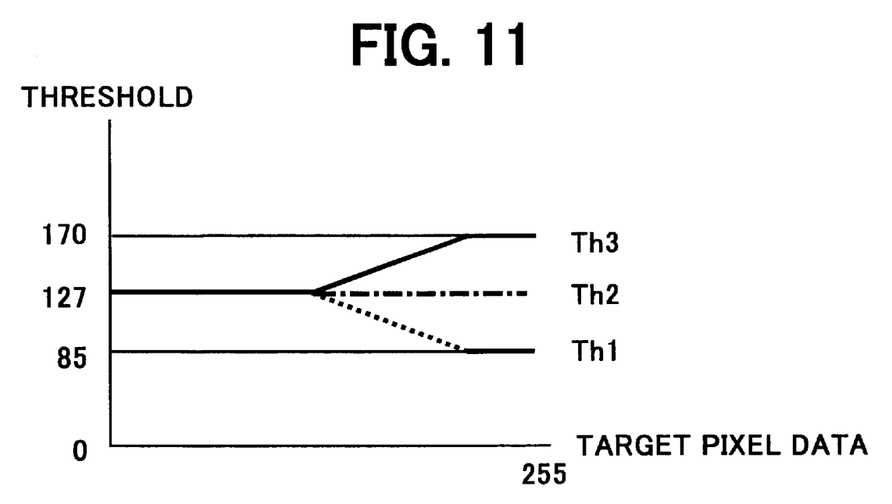
FIG. 11 is a chart illustrating another example of the thresholds.

Another embodiment is now described referring to FIG. 11. Although the above-described embodiment only refers to threshold generation control for three level error diffusion, error diffusion of more than three level can be executed substantially in the same manner as described above. For example, as illustrated in FIG. 11, if each difference between thresholds Th1 and Th2, and Th2 and Th3 is arranged to gradually increase at more than a prescribed target pixel data when four level error diffusion is practiced, substantially the same results as discussed above can be obtained.

Figure 12:
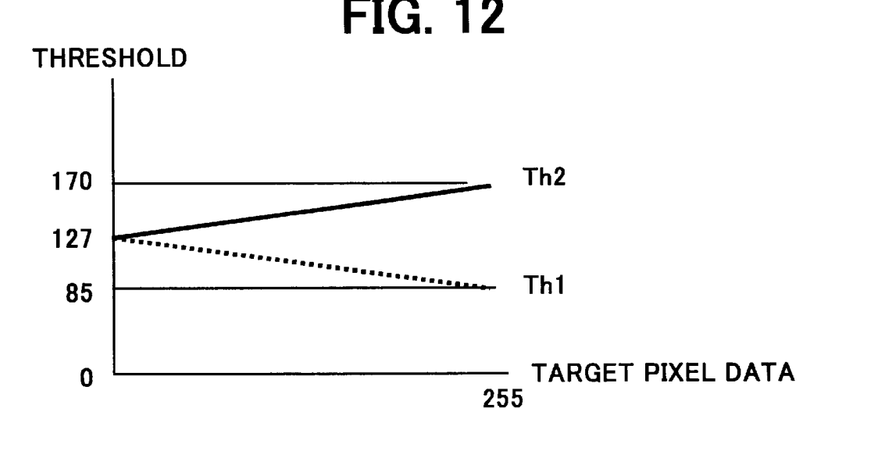
FIG. 12 is a chart illustrating a first modification of the thresholds illustrated in FIG. 11.
Figure 13:
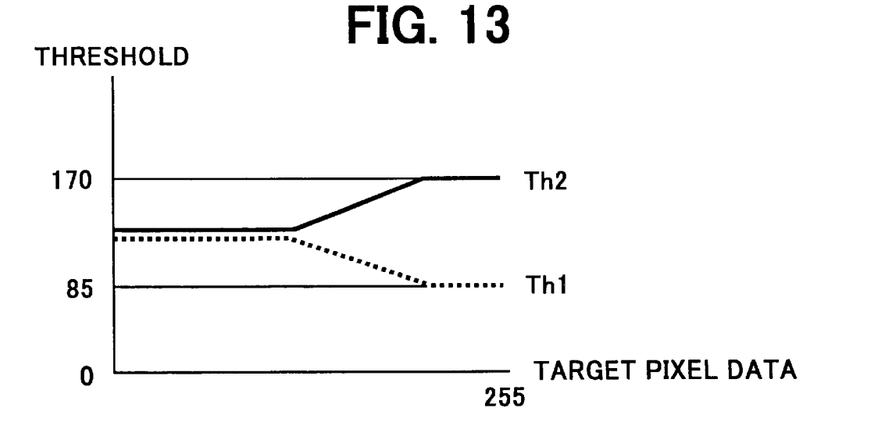
FIG. 13 is a chart illustrating a second modification of the thresholds illustrated in FIG. 11.

Although the above noted embodiment of FIG. 8 is arranged to accord the thresholds Th1 with the Th2 when a target pixel data is lower than gradation number 145 so as to perform a process in a similar manner to the two error diffusion techniques, those thresholds are not required to coincide with each other. For example, as illustrated in FIGS. 12 and 13, a frequency of generation of a middle level dot may decrease and an anti-banding performance may be improved if both of thresholds Th1 and Th2 are controlled to approach each other at least at a middle density range at which banding tends to be noticeable. As noted from FIG. 12, both of thresholds Th1 and Th2 may approach each other at an entire range (i.e., from gradation numbers 0 to 255). As noted from FIG. 13, both of the thresholds Th1 and Th2 may only approach each other at more than a prescribed level.

When the lowermost threshold Th1 is controlled to become smaller at more than a prescribed gradation number of target pixel data as illustrated in FIG. 8, a dot of the minimum level may easily appear when a gradation number of input image data transitions from small to large. In addition, it may be difficult for such a dot to appear when the gradation number of input image data transitions from large to small, to the contrary. To this end, as illustrated in FIG. 14, the start of a dot of the minimum level can be constant at least by setting the lowest level threshold Th1 to a prescribed fixed level (e.g. gradation number 85).

As a parameter of a threshold for multilevel error diffusion, a difference between thresholds and a level of a threshold Th may be exemplified. The difference between thresholds may control a frequency of appearance of a dot at its quantization level, and the threshold level may control start of appearance of a dot at its quantization level. Specifically, when the difference between thresholds is large, a dot of its quantization level easily appears, and when the difference is small, such a dot is suppressed from appearing. If the difference is zero, a dot of its quantization level does not appear. Further, if the threshold level Th is large, several processing operations are required before exceeding the threshold Th by accumulating error data. As a result, a start of a dot may be delayed as one characteristic. When the threshold Th is small, the dot start is early.

Figure 14:
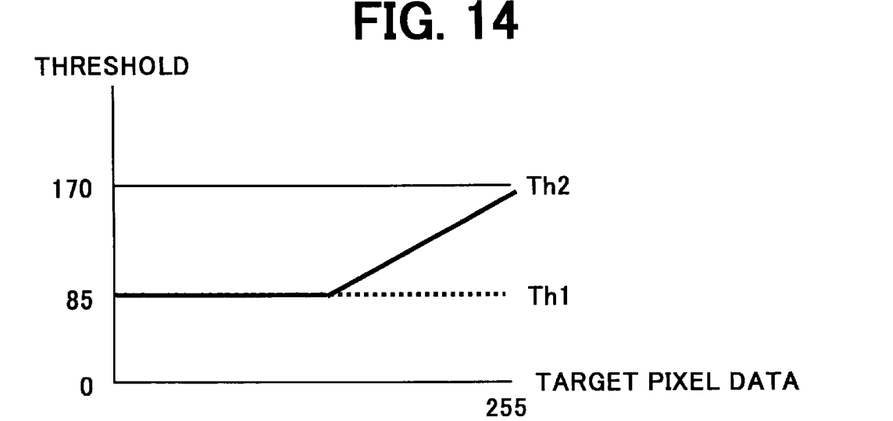
FIG. 14 is a chart illustrating a third modification of the thresholds illustrated in FIG. 11.
Figure 15:
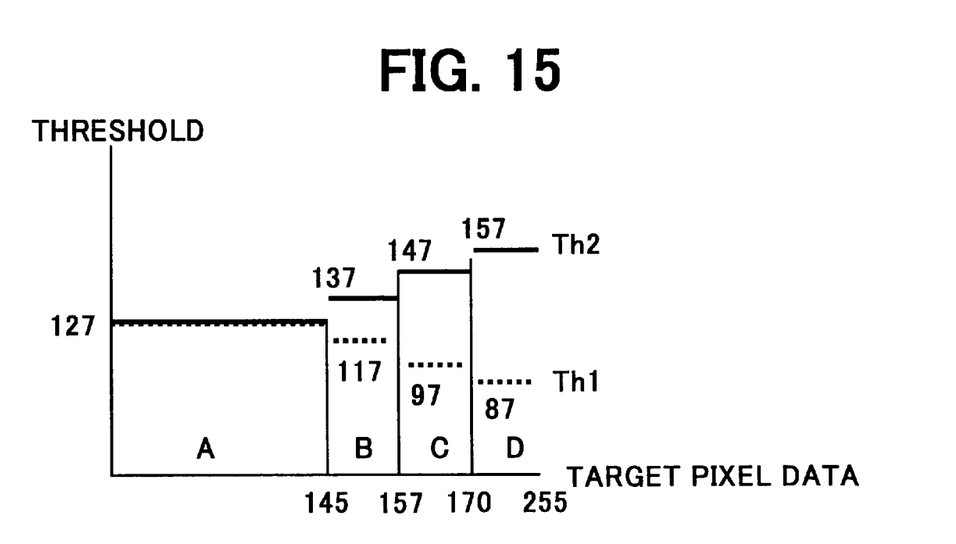
FIG. 15 is chart illustrating thresholds to be selected.
Figure 16:
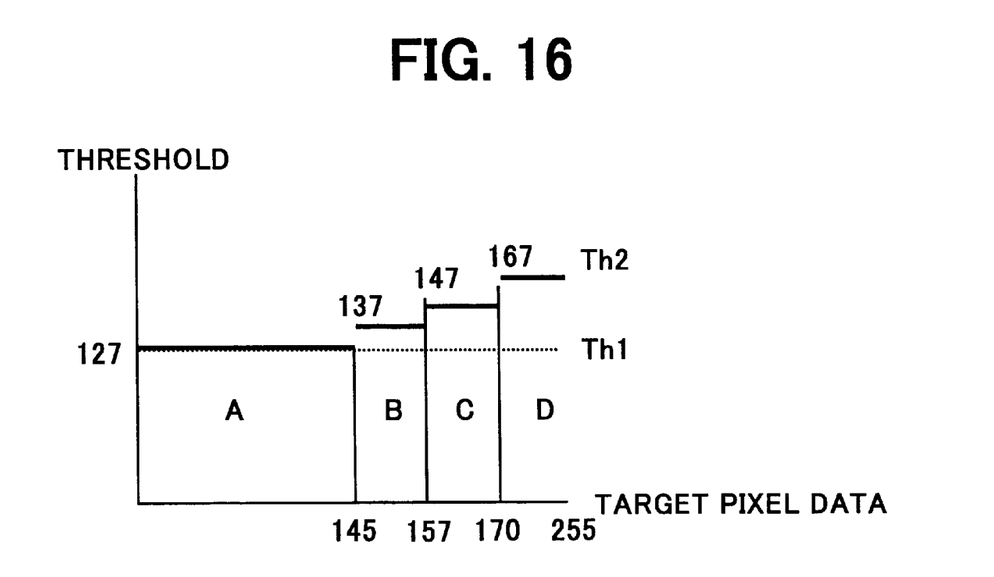
FIG. 16 is chart illustrating a modification of the thresholds illustrated in FIG. 15.

Then, as illustrated in FIG. 14, with the threshold Th1 set to a prescribed fixed level (e.g. gradation number 85), dot start can be constant when a gradation number of image data transitions. Further, as illustrated in FIGS. 15 and 16, a threshold generating device 6 can be selected from a plurality of threshold sets and is output. In such a construction, a threshold Th is not necessarily calculated by using a prescribed formula, and substantially the same result can be obtained by using a simple Boolean expression. FIG. 15 typically illustrates an example in which a threshold Th1 of the lowermost level varies, and FIG. 16 illustrates another example in which a threshold Th1 of the lowermost level is fixed.

Figure 17:
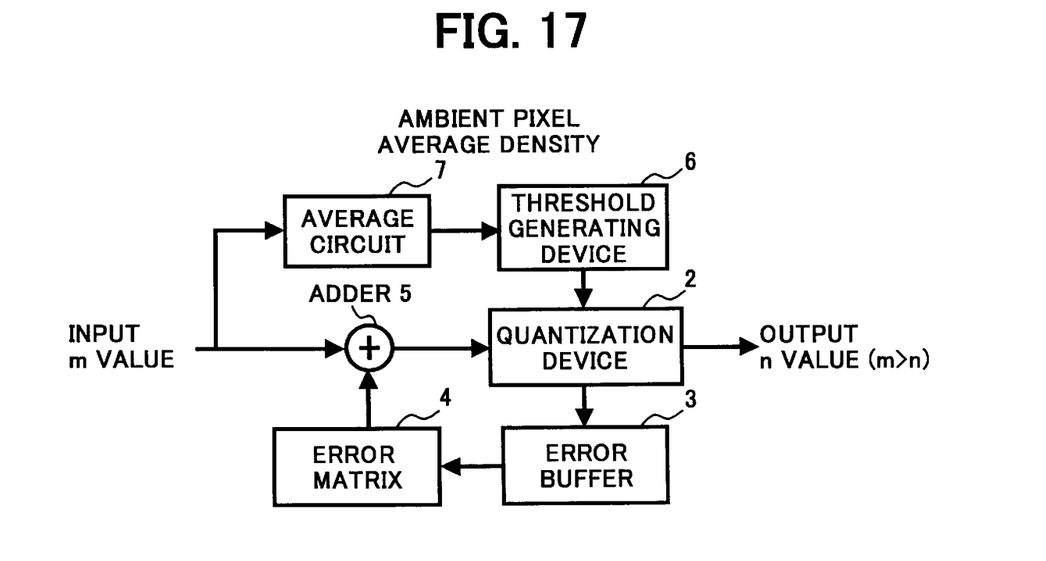
FIG. 17 is a block chart illustrating another example of an image processing apparatus according to the present invention.

In the above-described embodiment, a threshold Th is necessarily arranged based on a value (e.g. a gradation number) of target pixel data. However, a way of arranging a threshold not only based on data of the target pixel but also data of a pixel in the vicinity of the target pixel can also be efficient. For example, as illustrated in FIG. 17, an averaging circuit 7 may be provided to obtain an average value (gradation number) of the target pixel and its circumjacent pixels (totally nine pixels), and threshold generation control may be executed in substantially the same manner as described earlier based on the average value. As a result, even if there exists outstanding data, which is caused by the influence of noise or the like, in image data, appropriate threshold generation control is performed while preventing the influence of the noise.

Specifically, the present invention differs from a system in which a plurality of outputs from a multilevel quantization device are switched corresponding to a characteristic value. The present invention is different by controlling a provability of generation of a dot in each multilevel by controlling a plurality of thresholds Th for multilevel quantization. In particular, a technique may selectively switch a number of quantization levels from 6, 16, and so on. However, according to the present invention, generation of a dot having a prescribed quantization level can be suppressed by fixing a number of quantization levels (e.g. 3 levels) and varying a threshold.

Further, a background technique may control a number of quantization as small in a character section, and large in a picture and pattern section. However, the present invention controls a number of quantization to be large in a high density image, and to be small in a low density image, so that banding in the low density range and a high quality image in the high density range are possible. Further, although the background technique may require information of pixels in the vicinity of a target pixel, the present invention can obtain an efficient result from density information only of a target pixel.

Accordingly, according to the above-noted embodiments of the present invention, a high quality image can be reproduced. This is because a difference between thresholds is set small in a middle density range in which banding tends to appear so that a great number of dots of a prescribed quantization level, which is capable of stable dot representation, appear among a plurality of quantization levels. In addition, a difference between thresholds is set large in a high density range in which a dropout tends to appear so that a dot having a middle quantization level positively appears among a plurality of quantization levels.

Further, since a plurality of thresholds is controlled to substantially accord with each other below the middle density section, image quality that has an excellent antibanding performance can be obtained in a similar manner to the binary error diffusion. Further, since the lowermost threshold is arranged to be fixed, a start of a dot of a low density level can be constant in an image data transition section. Further, a threshold generating device is arranged to be selectively output from a plurality of threshold sets, and substantially the same result can be obtained even if a simple construction is utilized. Further, since threshold generation is controlled based on a target pixel and its circumjacent pixels, appropriate threshold control is executed while hardly being influenced by noise.

The mechanisms and processes set forth in the present invention may be implemented using one or more conventional general purpose microprocessors and/or signal processors programmed according to the teachings in the present specification as will be appreciated by those skilled in the relevant arts. Appropriate software coding can readily be prepared by skilled programmers based on the teachings of the present disclosure, as will also be apparent to those skilled in the relevant arts. However, as will be readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product which may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

What is claimed is:

1. An image processing apparatus configured to convert input image data having a first multivalue to image data having a second multivalue less than the first multivalue by using a multi error diffusion technique, said image processing apparatus comprising:

a threshold generating device configured to generate a plurality of variable thresholds at least based on a characteristic of a target pixel data, wherein a number of said variable thresholds is one less than a number of the second multivalue; and a quantization device configured to quantize the input image data of the target pixel into the image data having the second multivalue based on the variable thresholds, wherein said variable thresholds are varied such that predetermined quantized data quantized by the quantization device does not create noticeable banding substantially in a middle density range and does not create noticeable dropout substantially in a high density range.

2. The image processing apparatus according to claim 1, wherein said threshold generating device generates the variable thresholds based on input image data of the target pixel and at least one circumjacent pixel.

3. The image processing apparatus according to claim 2, wherein said variable thresholds are determined based on an average of the input image data of the target pixel and the at least one circumjacent pixel.

4. The image processing apparatus according to claim 1, wherein a difference of said variable thresholds increases in accordance with an increase in a value of the input image data of the target pixel.

5. The image processing apparatus according to claim 1, wherein said variable thresholds are substantially the same even if the input image data of the target pixel increases in value.

6. The image processing apparatus according to claim 4, wherein said variable thresholds are at least partially equal to each other, when a value of input image data of the target pixel is less than a predetermined level.

7. The image processing apparatus according to claim 1, wherein a lowest of said variable thresholds is fixed to a predetermined level.

8. The image processing apparatus according to claim 1, wherein said threshold generating device selects and sets one set of the variable thresholds from a plurality of thresholds sets.

9. An image processing method for converting input image data having a first multivalue to image data having a second multivalue less than the first multivalue by using a multi error diffusion technique, said image processing method comprising the steps of:

generating a plurality of variable thresholds at least based on a characteristic of a target pixel data, wherein a number of said variable thresholds is less than a number of the second multivalue by one;

quantizing the input image data of the target pixel into the image data having the second multivalue based on the variable thresholds; and varying plural of the variable thresholds such that predetermined quantized data does not create noticeable banding substantially in a middle density range and does not create noticeable dropout substantially in a high density range.

10. The image processing method according to claim 9, wherein said variable thresholds are generated based on input image data of the target pixel and at least one circumjacent pixel.

11. The image processing method according to claim 10, wherein said variable thresholds are determined based on an average of the input image data of the target pixel and the at least one circumjacent pixel.

12. The image processing method according to claim 9, wherein a difference of said variable thresholds increases in accordance with an increase in a value of the input image data of the target pixel.

13. The image processing method according to claim 9, wherein said variable thresholds are substantially the same even if the input image data of the target pixel increases in value.

14. The image processing method according to claim 12, wherein said variable thresholds are at least partially equal to each other, when a value of input image data of the target pixel is less than a predetermined level.

15. The image processing method according to claim 9, wherein a lowest of said variable thresholds is fixed to a predetermined level.

16. The image processing method according to claim 9, wherein said variable thresholds are selected and set from a plurality of thresholds sets.

17. An image processing apparatus for converting input image data having a first multivalue to image data having a second multivalue less than the first multivalue by using a multi error diffusion technique, said image processing apparatus comprising:

threshold generating means for generating a plurality of variable thresholds at least based on a characteristic of a target pixel data, wherein a number of said variable thresholds is one less than a number of the second multivalue; and a quantization means for quantizing the input image data of the target pixel into the image data having the second multivalue based on the variable thresholds, and for varying said variable thresholds such that predetermined quantized data quantized by the quantization device does not create noticeable banding substantially in a middle density range and does not create noticeable dropout substantially in a high density range.

* * * * *